United States Patent
Ringen

(10) Patent No.: US 9,094,740 B2
(45) Date of Patent: Jul. 28, 2015

(54) ARCHITECTURE TO SCALE AN IP/MPLS NETWORK VIA MULTIPLE NETWORK PLANES

(75) Inventor: Deron Ringen, Acworth, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 1143 days.

(21) Appl. No.: 12/963,376

(22) Filed: Dec. 8, 2010

(65) Prior Publication Data

US 2012/0148238 A1 Jun. 14, 2012

(51) Int. Cl.
*H04Q 11/00* (2006.01)

(52) U.S. Cl.
CPC ... *H04Q 11/0062* (2013.01); *H04Q 2011/0077* (2013.01)

(58) Field of Classification Search
CPC ............... H04Q 11/0062; H04Q 2011/0077
USPC ............................. 398/50, 51, 54, 56
See application file for complete search history.

(56) References Cited

U.S. PATENT DOCUMENTS

| | | | |
|---|---|---|---|
| 6,400,689 B1 | 6/2002 | Sato et al. | |
| 7,054,557 B1* | 5/2006 | Dasylva et al. | 398/48 |
| 7,272,313 B2* | 9/2007 | Nakamura et al. | 398/51 |
| 7,463,637 B2 | 12/2008 | Bou-Diab et al. | |
| 2005/0262264 A1 | 11/2005 | Ando et al. | |
| 2006/0142001 A1* | 6/2006 | Moisan et al. | 455/428 |
| 2007/0110437 A1* | 5/2007 | Bennett | 398/37 |
| 2008/0310424 A1 | 12/2008 | Peterson et al. | |
| 2009/0232492 A1* | 9/2009 | Blair et al. | 398/5 |
| 2010/0128601 A1* | 5/2010 | Bennett et al. | 370/225 |
| 2010/0149988 A1* | 6/2010 | Matsubara et al. | 370/237 |
| 2011/0176438 A1* | 7/2011 | Sanita et al. | 370/252 |

OTHER PUBLICATIONS

Wikipedia, "Multiprotocol Label Switching", retrieved from http://en.wikipedia.org/wiki/Multiprotocol_Label_Switching on Nov. 10, 2010; This page was last modified on Oct. 31, 2010 at 14:48; Wikipedia is a registered trademark of the Wikimedia Foundation, Inc., a non-profit organization.

* cited by examiner

*Primary Examiner* — Shi K Li
(74) *Attorney, Agent, or Firm* — Cantor Colburn LLP

(57) ABSTRACT

An architecture is provided for a core network of a service provider. Intra-connect routers operate multiprotocol label switching under Internet protocol for packets. Network planes are coupled in parallel to the intra-connect routers to form the core network for the service provider. Each of the network planes is defined by a maximum optical load capacity of an optical switch.

20 Claims, 6 Drawing Sheets

500

Manage a first intra-connect router operating multiprotocol label switching under Internet protocol for packets, where network planes are coupled in parallel to the first intra-connect router and a second intra-connect router to form a core network for a service provider 505

Instruct the first intra-connect router to route optical traffic over the network planes to the second intra-connect router as defined by a maximum optical load capacity of a respective optical switch in each of the network planes 510

FIG. 5

ARCHITECTURE TO SCALE AN IP/MPLS NETWORK VIA MULTIPLE NETWORK PLANES

BACKGROUND

Exemplary embodiments relate to networks, and more specifically, to an architecture for scaling a network.

A telecommunications network is a collection of terminals, links, and nodes which connect together to enable telecommunication between users of the terminals. Networks may use circuit switching or message switching. Each terminal in the network has a unique address so messages or connections can be routed to the correct recipients. The collection of addresses in the network is called the address space. The links connect the nodes together and are themselves built upon an underlying transmission network which physically pushes the message across the link.

Telecommunication networks may be made up of five basic components that are present in each network environment. These basic components may include terminals, telecommunications processors, telecommunications channels, computers, and/or telecommunications control software. Terminals are the starting and stopping points in any telecommunication network environment. Any input or output device that is used to transmit or receive data can be classified as a terminal component. Telecommunications processors support data transmission and reception between terminals and computers by providing a variety of control and support functions, i.e. convert data from digital to analog and back. Telecommunications channels are the way by which data is transmitted and received. Telecommunication channels are created through a variety of media of which the most popular include copper wires and coaxial cables. Fiber-optic cables are increasingly used to bring faster and more robust connections to businesses and homes.

Multiprotocol Label Switching (MPLS) is a mechanism in high-performance telecommunications networks which directs and carries data from one network node to the next. MPLS makes it easy to create "virtual links" between distant nodes. It can encapsulate packets of various network protocols. MPLS is a highly scalable, protocol agnostic, data-carrying mechanism. In an MPLS network, data packets are assigned labels. Packet-forwarding decisions are made solely on the contents of this label, without the need to examine the packet itself. This allows one to create end-to-end circuits across any type of transport medium, using any protocol. The primary benefit is to eliminate dependence on a particular Data Link Layer technology, and eliminate the need for multiple Layer 2 networks to satisfy different types of traffic. MPLS belongs to the family of packet-switched networks. It was designed to provide a unified data-carrying service for both circuit-based clients and packet-switching clients which provide a datagram service model. It can be used to carry many different kinds of traffic, including Internet protocol (IP) packets, as well as native Asynchronous Transfer Mode (ATM), Synchronous Optical Networking (SONET), and Ethernet frames.

BRIEF SUMMARY

According to exemplary embodiments, an architecture is provided for a core network of a service provider. Intra-connect routers operate multiprotocol label switching under Internet protocol for packets. Network planes are coupled in parallel to the intra-connect routers to form the core network for the service provider. Each of the network planes is defined by a maximum optical load capacity of an optical switch.

According to exemplary embodiments, a management system is provided. Memory stores a program, and a processor is functionally coupled to the memory and is responsive to computer-executable instructions contained in the program. The processor is operative to manage a first intra-connect router operating multiprotocol label switching under Internet protocol for packets, where network planes are coupled in parallel to the first intra-connect router and a second intra-connect router to form a core network for a service provider. The processor is operative to instruct the first intra-connect router to route optical traffic over the network planes to the second intra-connect router as defined by a maximum optical load capacity of a respective optical switch in each of the network planes.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

DETAILED DESCRIPTION OF EXEMPLARY EMBODIMENTS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 5 illustrates a flow chart in accordance with exemplary embodiments.

DETAILED DESCRIPTION OF EXEMPLARY EMBODIMENTS

As a service provider grows customers and adds more data services there is a desire to combine all of the data customers and services onto a single core IP/MPLS network. The benefit of leveraging a single converged core network is a reduction of capital, operating, information technology (IT), and design costs. However, as illustrated in FIG. 1, the capacity demands on a single converged core network 100 has the potential to out pace the technology and the ability of the core network 100 to provide the required capacity.

Figure 1:
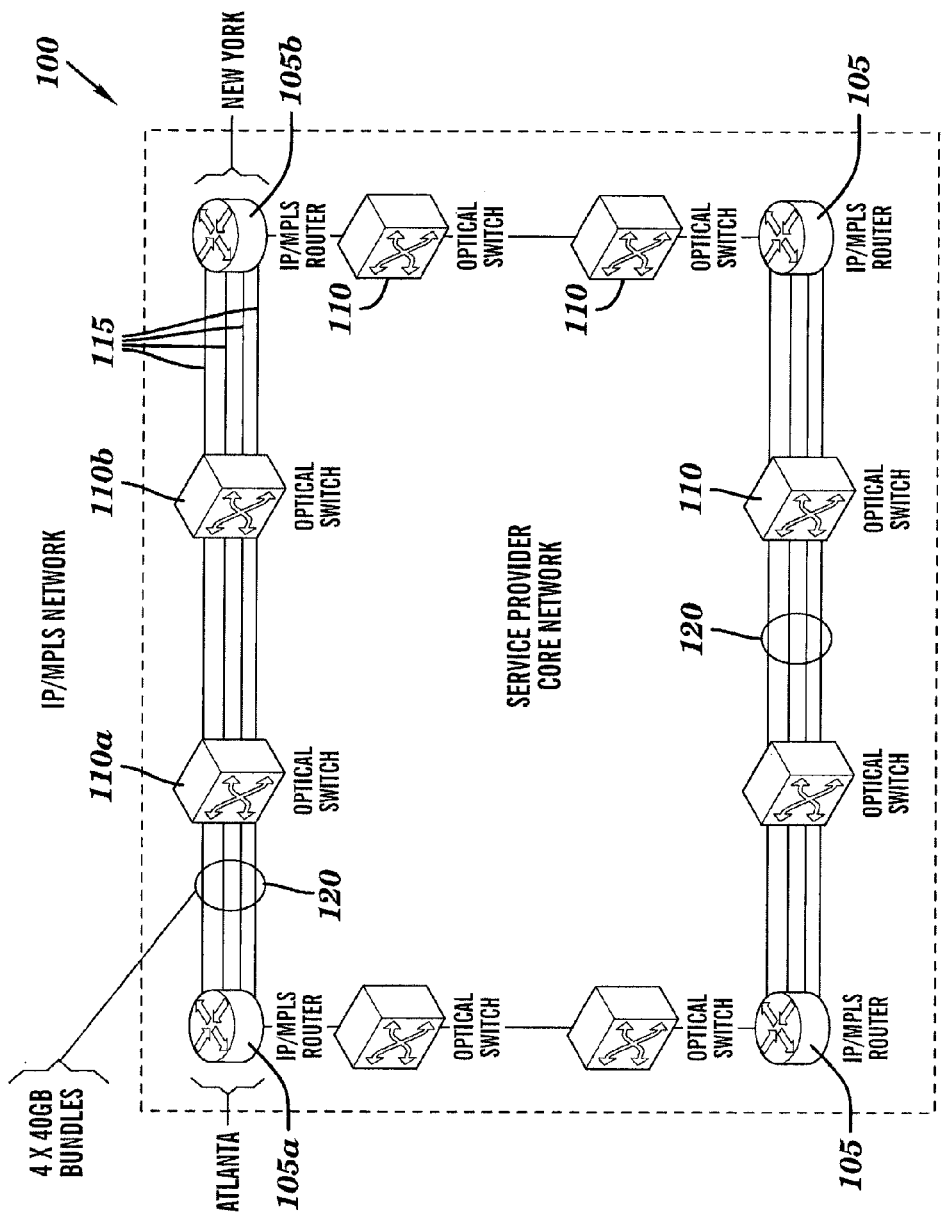
FIG. 1 illustrates a block diagram of an exemplary architecture.

FIG. 1 illustrates an example of an exemplary architecture for a service provider having a multiprotocol label switching and Internet protocol (IP/MPLS) network for transferring packets. To date, a service provider creates a single flat core network 100. In the single core network 100, there may be multiple IP/MPLS routers 105, optical switches 110, and fiber optic cables 115 for providing various connections. Although not shown, there may be various other devices such as servers, computing devices, hubs, gateways, etc., in the single core network 100, and these other devices may be connected in the single core network 100 through fiber optic cable 115 and/or other connection mediums. Note that optical switches 110 generally refer to all optical switches, and for explanation purposes specific reference may be made to optical switches 110a and 110b. Likewise, IP/MPLS routers 105 generally refer to all IP/MPLS routers, and for explanation purpose specific reference may be made to IP/MPLS routers 105a and 105b.

The optical switch 110 is an optical transport device. Currently, an optical transport device such as the optical switch 110 can support connectivity of optical traffic up to 40 gigabytes (GB) as an example. For transporting more than 40 GB of optical data in the core network 100, this service provider has to utilize optical bundles such as optical bundles 120 of the fiber optic cables 115 at each optical switch 110 connecting Atlanta and New York. The terms optical load, optical traffic, optical data, capacity demand, optical load capacity, and data may be utilized interchangeably to refer to the traffic transmitted and received via the network of a service provider.

For example, if a single service provider supports all of its services between Atlanta and New York on the fiber optic cables 115 and the optical load is greater than 40 GB, then optical bundles 120 have to be prepared and connected at each optical switch 110a and 110b identified in this scenario as connecting Atlanta and New York. If it is assumed that the optical load is 200 GB entering and exiting at optical switches 110a and 110b, then the optical bundle 120 would be a bundle of 4 separate 40 GB optical cables 115 at each optical switch 110a and 110b because there is currently no 200 GB optical switch to connect Atlanta to New York in this scenario. Although the 40 GB scenario may be referred to herein for explanation purposes, exemplary embodiments are not meant to be limited to optical switches capable of 40 GB and/or fiber optical cables of 40 GB. Optical technology is working on 100 GB optical switches, and it is contemplated that faster optical switches may be developed in the present and/or near future, which can utilize the features of exemplary embodiments as discussed herein.

Figure 2:
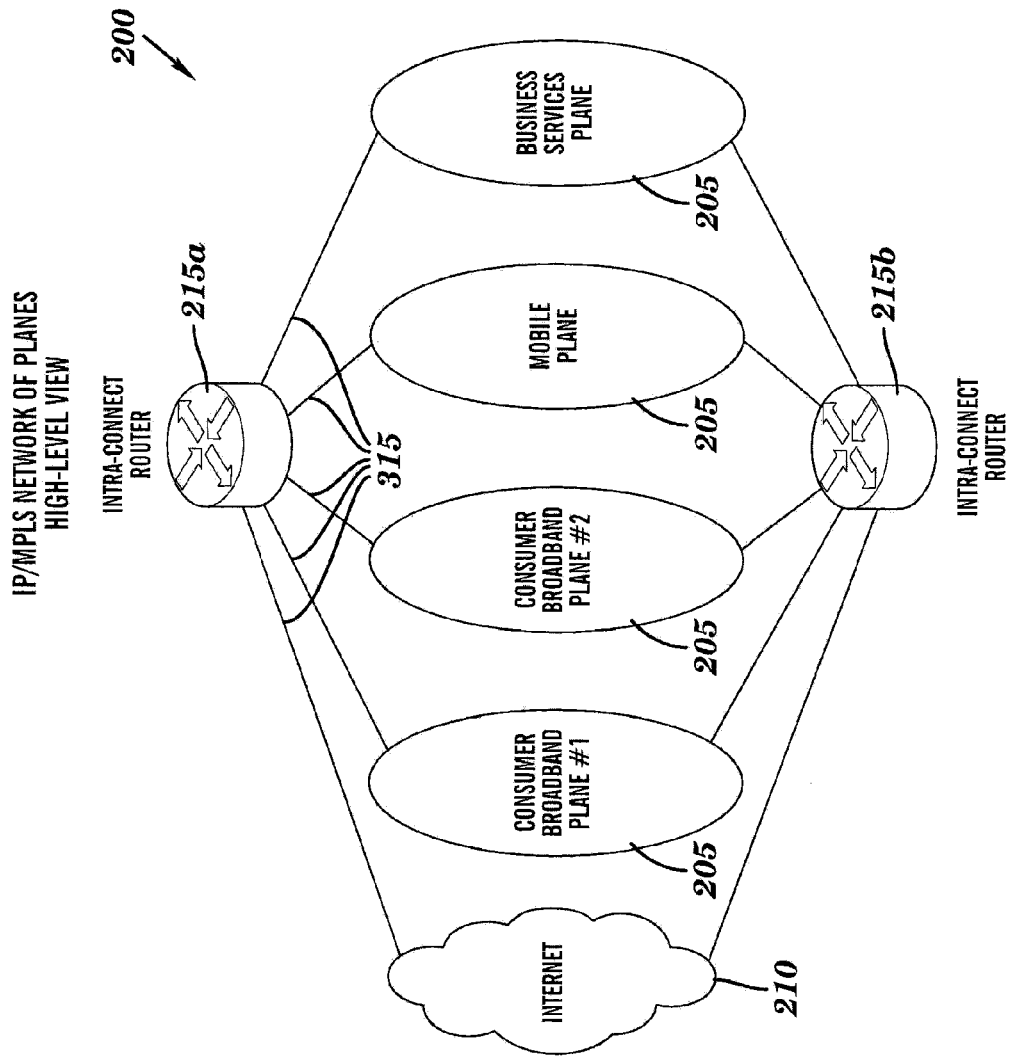
FIG. 2 illustrates a block diagram of an architecture in accordance with exemplary embodiments.
Figure 3:
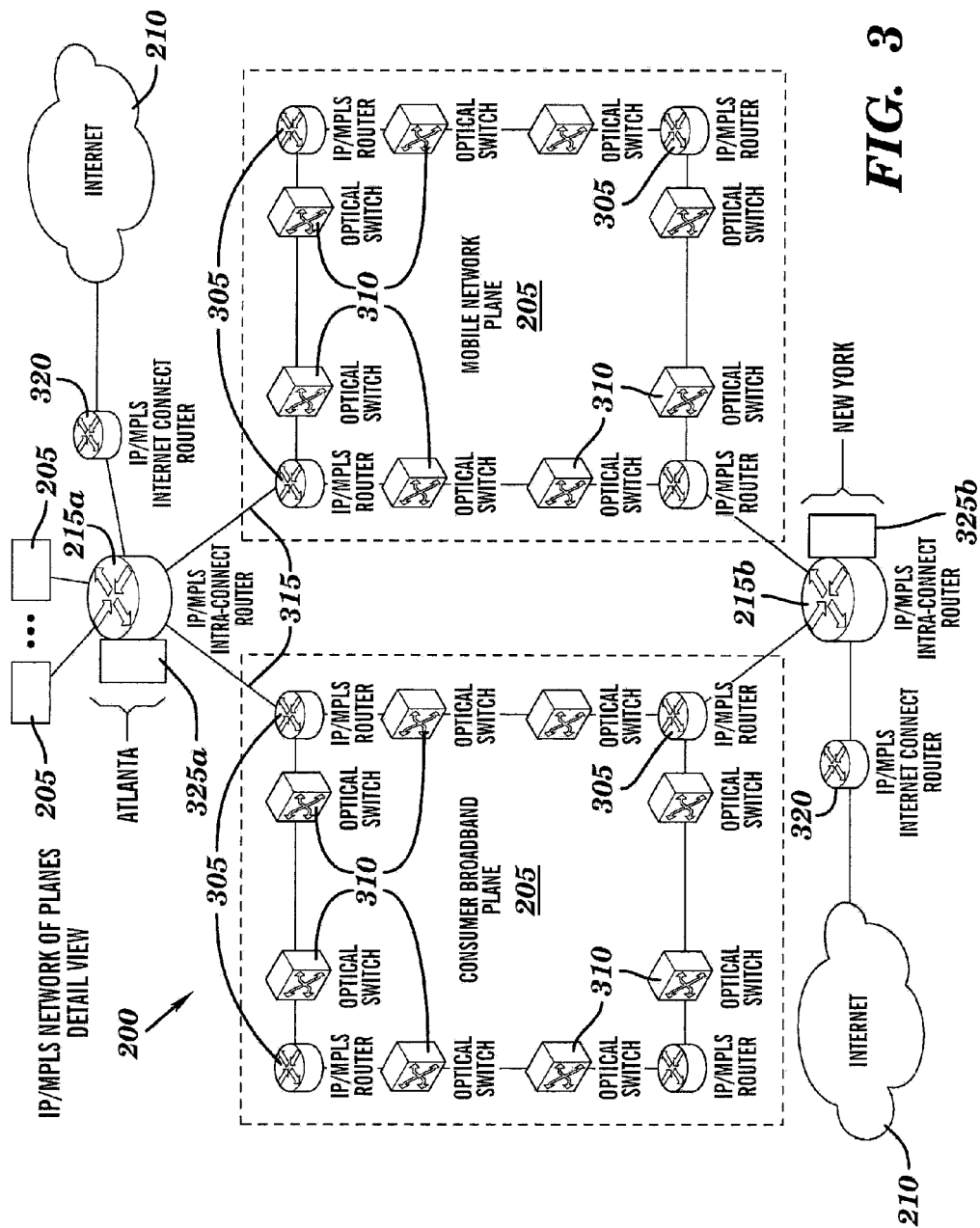
FIG. 3 illustrates a block diagram of an architecture in accordance with exemplary embodiments.

Instead of requiring a 200 GB optical switch, requiring an optical bundle of 200 GB at the optical switch, and/or requiring any optical bundle at the optical switch for an optical load which may be greater than the present optical switch technology capacity, exemplary embodiments provide an architecture that creates a core network that has greater ability to scale and allows the optical technology to keep pace with capacity demand of a converged data and services network as shown in FIGS. 2 and 3.

Exemplary embodiments provide an architecture to create a core IP/MPLS network 200 for a single service provider by defining several network planes, and exemplary embodiments connect the network planes together at interconnect points as illustrated in FIGS. 2 and 3. Although FIGS. 2 and 3 illustrate a core network of a single service provider, exemplary embodiments can be utilized for a plurality of service providers who may in turn operatively connect their networks to the networks of a plurality of other service providers. Particularly, exemplary embodiments illustrate an architecture for each individual service provider network, which can be connected to other service provider networks as understood by one skilled in the art.

Referring to FIG. 2, FIG. 2 illustrates a high level view of an IP/MPLS network of planes 205 in accordance with exemplary embodiments. In exemplary embodiments, multiple planes 205 of IP/MPLS networks are leveraged to create the single core IP/MPLS network 200. By creating the multiple network planes 205, the core network 200 as a whole is able to scale more efficiently and cost effectively.

In FIG. 2, the single core network 200 may comprise a plurality of network planes 205, where each network plane 205 is connected to IP/MPLS intra-connect routers 215. In some cases, the Internet may also be considered as a plane 210 of the core network 200 since the Internet plane 210 is connected to the IP/MPLS intra-connect routers 215 in parallel to the other network planes 205. Conversely, in some cases, the Internet plane 210 may not be considered part of the service provider core network 200 but as part of a different service provider network because the Internet plane 210 comprises networks of other service providers.

FIG. 3 illustrates further details of the service provider core network 200 according to exemplary embodiments. The network planes 205 are made of IP/MPLS routers 305 and optical switches 310, along with other servers, computing devices, gateways, hubs, routers, etc. (not shown), which may be operatively connected to customer premises equipment. The optical switches 310 connect the IP/MPLS routers 305 together to create each network plane 205. The various network planes 205 connect to the IP/MPLS intra-connect routers 215, and the IP/MPLS intra-connect routers 215 directs optical traffic to and from each network plane 205. The IP/MPLS intra-connect routers 215 may connect to an IP/MPLS Internet connection router 320 which connects to the Internet 210.

By creating the multiple network planes 205, the optical transport network which includes the optical switches 310 in FIG. 3 is utilized more effectively and the optical switches 310 (now without optical bundling) would no longer be the limiting factor of the core IP/MPLS network 200 as is currently the case in the core IP/MPLS network 100. Instead of extremely large optical transport facilities which house the optical switches and fiber optic bundles 120 required to scale the core IP/MPLS network 100 in FIG. 1, the scaling would occur on the network planes 205 of the IP/MPLS intra-connect routers 215 in FIGS. 2 and 3.

In one implementation of exemplary embodiments, without optical bundling, each network plane 205 may (exclusively) be an individual service provided by the core network 200. For example, one network plane 205 may be an Internet service plane, another network plane 205 may be a private/virtual private network (VPN) (business) service plane, another network plane 205 may be a mobile phone service plane, and another network plane 205 may be a video/television (TV) service plane. It is understood that other services not shown may be respectively assigned to their own network planes 205. Any device on any network plane 205 can communicate to any other device on any other network plane 205 via the IP/MPLS intra-connect routers 215. All the interconnected network planes 205 together comprise the core network 200 for a service provider in exemplary embodiments.

Additionally and/or alternatively, in one implementation of exemplary embodiments, each network plane 205 may be one service and/or multiple services provided by the core network 200. For each network plane 205, each network plane 205 has an optical transport load up to the optical load capacity of each respective optical switch 310 without utilizing optical bundling at the optical switches 310 in that network plane 205. The optical load capacity of an optical switch is currently 40 GB and may soon be 100 GB (or more) per optical switch 310 without fiber optical bundling. For example, one network plane 205 may collectively include private/virtual private network (VPN) (business) services, mobile phone services, and video/television (TV) services, and that network plane 205 is configured to transport an optical load up to the optical load capacity of the optical switches 310 in that network plane 205.

Each IP/MPLS intra-connect router 215 may be coupled to a management system 325, which is a computing device, e.g., such as a server. The management system 325 stores information in memory for each individual network plane 205 that is connected to the IP/MPLS intra-connect router 215. For the network planes 215 that are connected to a particular IP/MPLS intra-connect router 215, the management system 325 instructs the IP/MPLS intra-connect router 215 on whether each connected network plane 215 comprises a singe service and/or multiple services. Also, the management system 325 comprises information on and instructs the IP/MPLS intra-connect router 215 on which individual service or multiple services (Internet services, private/virtual private network (VPN) (business) services, mobile phone services, and video/television (TV) services) are in each network plane 205 operatively connected to the particular IP/MPLS intra-connect router 215. The management system 325 is configured to cause the optical load transferred on the network plane 205 not to exceed the maximum optical load capacity of any optical switch within that particular network plane.

Although illustrated as two separate devices in FIG. 3, the IP/MPLS intra-connect router 215 and the management system 325 may be implemented as a single device having the functionality discussed herein. Note that although a few network planes 205 and IP/MPLS intra-connect routers 215 are illustrated in FIGS. 2 and 3, it is understood that numerous network planes 205 may be connected to numerous IP/MPLS intra-connect routers 215 with incoming and outgoing optical traffic according to exemplary embodiments.

In the following example, assume that the optical load capacity is X amount of GB for optical transport, e.g., without requiring optical bundling. When greater optical load capacity is needed for this service provider, the service provide as instructed by the management system 325 adds another network plane 205 having all the services discussed above and connects the different network planes 205 to each other via the IP/MPLS intra-connect routers 215 located at different geographical locations. By adding each additional network plane 205 interconnected by IP/MPLS intra-connect routers 215, the service provider increases the overall optical load capacity of the core network 200 without requiring optical bundles at the optical switches 310 in the network planes 205. Although only two IP/MPLS intra-connect routers 215 are illustrated in FIGS. 2 and 3 for conciseness, the core IP/MPLS network 200 may include numerous IP/MPLS intra-connect routers 215 operatively connecting numerous network planes 205, 210. Also, a network plane 205 may be operatively connected to numerous IP/MPLS intra-connect routers 215 where each of the IP/MPLS intra-connect routers 215 spans large geographical locations.

Accordingly, exemplary embodiments provide the architecture to reduce the capacity requirements on the optical transport network, e.g., without having to utilize optical bundling and without having to utilize the optical equipment needed to support optical bundling at optical switches. For example, instead of having a single core IP/MPLS network with the optical transport requirement of X (e.g., 200 GB or 10,000 GB) at the optical switch 310, exemplary embodiments can offer N number of network planes 205 of IP/MPLS networks each with an optical transport load requirement of X/N. For example, instead of having a single core network with an optical transport requirement of X=120 GB, exemplary embodiments would have N=3 planes each with an optical transport requirement of 40 GB. Also, by concentrating the optical transport capacity requirements of the IP/MPLS intra-connect routers 215 to fewer locations the overall cost of building a high capacity IP/MPLS network 200 can be reduced Once more, referring to the scenario of a single service provider supporting all of its services between Atlanta and New York on the fiber optic cables 315 and the optical load is greater than 40 GB (or some other optical load amount that exceeds the optical load capacity of any one optical switch 310 in the network plane 205), unlike FIG. 1 the service provider of the core network 200 is not required to implement optical bundles (shown as 120 in FIG. 1). It is assumed that IP/MPLS intra-connect router 215a and its management system 325a are in Atlanta and IP/MPLS intra-connect router 215b and its management system 325b are in New York. It is also assumed that the optical load of 200 GB is needed on the core network 200 for the service provider, and there is currently no 200 GB optical switch to connect Atlanta to New York in this scenario. According to exemplary embodiments, the core network 200 can comprise, e.g., a consumer broadband service plane #1 205, a consumer broadband service plane #2 205, a mobile service plane 205, a business service plane 205, and an additional mobile service plane 205. Each of these 5 network planes 205 can comprise a 40 GB optical transport load to total of 5×40 GB=200 GB for the optical transport load. Also, in one case each of the 5 network planes 205 may comprise all of the services offered by service provider, some of the 5 network planes 205 may comprise all of the services (such as, e.g., Internet services, private/virtual private network (VPN) (business) services, mobile phone services, and video/television (TV) services), some of the 5 network planes may comprise individual services while others network planes include multiple services, each network planes 205 may comprise an individual type of service, and/or any combination of the above. The management system 325 would instruct its IP/MPLS intra-connect router 215 to route the optical load traffic based on the service(s) of the network planes operatively connected to the IP/MPLS intra-connect router 215 and based on not exceeding the maximum optical load capacity of the optical switches 310 respectively in the network planes 205.

Referring to the scenario above, since the multiple network planes 205 are each configured to (only) optically transport a load that does not exceed its respective optical switch 310, no optical bundling is required to support the optical switches 310. Further, the management system 325a is configured to divide the optical load over the network planes 205 such that no one network plane 205 exceeds its maximum optical load capacity without optical bundling. For example, the management system 325 stores network plane information which includes each of the service(s) offered by each network plane 205, the maximum optical load capacity for each optical switch 310 in each network plane 205, and the network planes 205 that are single service planes. For example, the management system 325a is configured to divide the optical load received at its IP/MPLS intra-connect router 215a among the network planes 205 connected to IP/MPLS intra-connect router 215a. As discussed above, the management system 325a knows each network plane 205 connected to its IP/MPLS intra-connect router 215a, each service supported by each connected network plane 205, and the optical load capacity of each optical switch 310 in each network plane 205. By accounting for the above stored information, for each of the services, the management system 325a determines the amount of optical load that is assigned to each network plane 205 connected to its IP/MPLS intra-connect router 215a. For example, if one connected network plane 205 had an optical switch 310 with a 40 GB maximum capacity for a particular service(s), then the management system 325a would cause the IP/MPLS intra-connect router 215a to route 40 GB of the optical load on that network plane 205 according to its service(s). Also, if one connected network plane 205 had an optical switch 310 with a 100 GB maximum capacity for particular services, then the management system 325a would cause the IP/MPLS intra-connect router 215a to route 100 GB of the optical load on that network plane 205 according to its service(s) which may be an individual service and/or multiple services. The management system 325a makes this determination and assignment for each network plane 205 coupled to the IP/MPLS intra-connect router 215a.

As discussed herein, in today's converged service provider IP/MPLS network, scale and scale limits are a growing issue. The capacity requirements of the today's service providers have surpassed or may surpass the technology of the optical network. The scale of the core IP/MPLS intra-connect routers 215 has been able to keep pace and ahead of the capacity requirements. However, the optical networks have not been able to. As such, the technology related to the IP/MPLS intra-connect routers 215 is able to keep pace with the demand by new and existing customers and/or new and existing services, and the IP/MPLS intra-connect routers 215 are not restrained by the optical load capacity limits of optical switch technology. Exemplary embodiments are configured to leverage continuous improvements in IP/MPLS intra-connect router technology as discussed herein.

Figure 4:
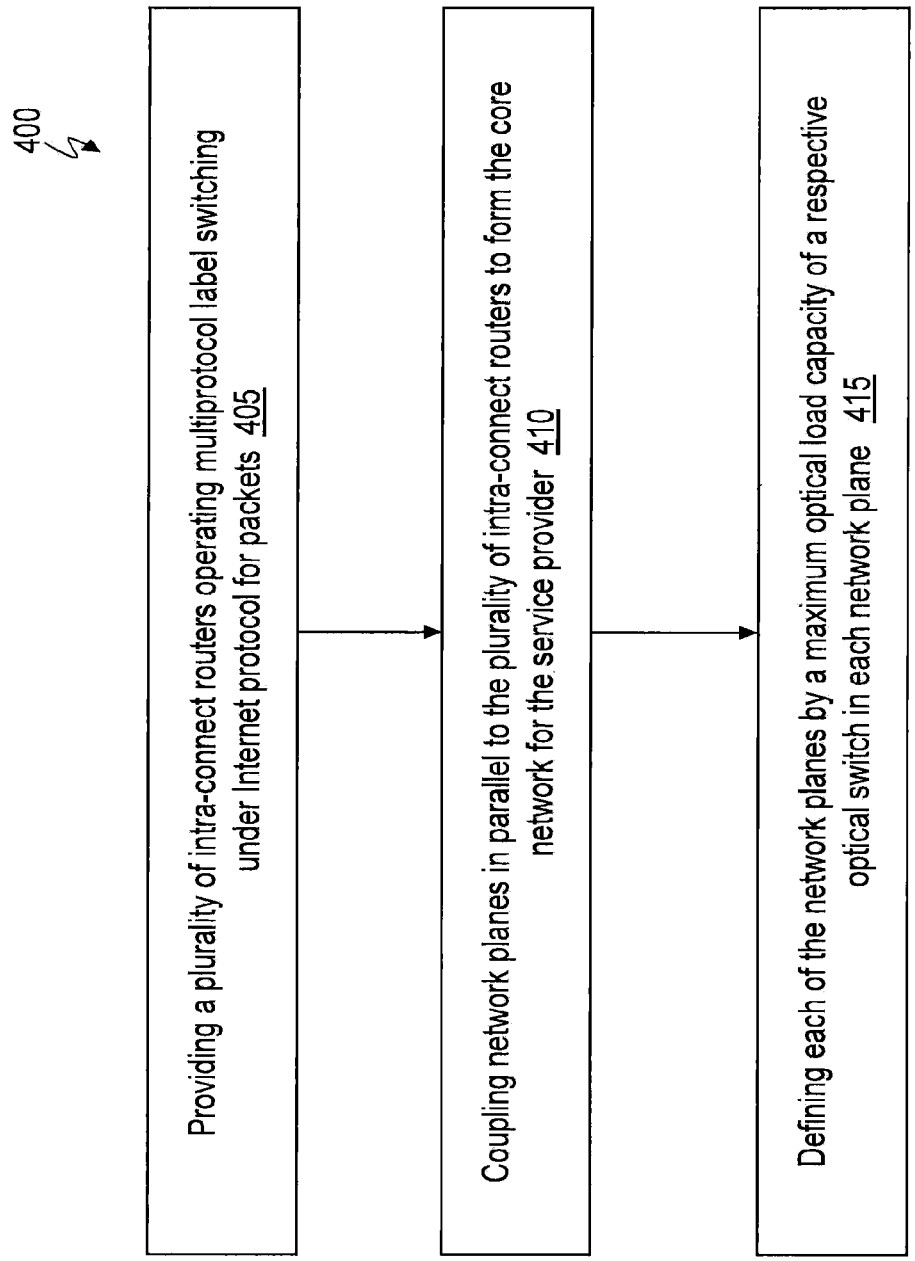
FIG. 4 illustrates a flow chart in accordance with exemplary embodiments.

FIG. 4 illustrates a flow chart 400 for providing an architecture of multiple network planes 205 in the core network 200 for a single service provider who offers multiple services according to exemplary embodiments. In one implementation, a computer program product having one or more software applications in the management systems 325 is configured to cause the flow chart 400 to be implemented by monitoring and reviewing each service of a service provider and instructing the service provider on how to create network planes 205 and assign optical loads to the network planes 205 according to exemplary embodiments, which may include a user inputting service information and following instructions provided by the management systems 325; the management systems 325 may graphically display a logical view of each of the network planes 205 connected to its IP/MPLS intra-connect router 215 and the service(s) respectively supported by the connected network planes 205. Also, for each IP/MPLS intra-connect router 215, the management system 325 is configured to determine and instruct how many additional/different network planes 205 are needed in the core network 200 and the types of service(s) for each additional network plane 205, when, e.g., one of the optical switches 310 on a network plane 205 is nearing and/or exceeding its maximum optical load capacity without optical bundling. All network plane 205 information is stored in the management system 325 for its corresponding IP/MPLS intra-connect router 215.

Now referring back to FIG. 4, a plurality of intra-connect routers 215 operate multiprotocol label switching under Internet protocol for packets at block 405.

The network planes 205 are coupled in parallel to the plurality of IP/MPLS intra-connect routers 215 to form the core network for the service provider at block 410. Being coupled in parallel allows each individual network plane 205 to connect at a first end to, e.g., a first IP/MPLS intra-connect router 215a in a first geographical location while the second end of each network plane 205 is connected to a second IP/MPLS intra-connect router 215b in a second geographical location. Each geographical location may be separated by large distances such as, e.g., hundreds or thousands of miles apart.

Each of the network planes 205 is defined by a maximum optical load capacity of an optical switch in each respective network plane 205 at block 415.

Further, according to exemplary embodiments, each of the network planes 205 comprises the maximum optical load capacity for transporting optical loads on fiber optic cable 315 without requiring optical bundling at respective optical switches 310 for each network plane 205. When the maximum optical load capacity of the optical switch 310 is exceeded in one of the network planes 205, another network plane 205 is coupled to the plurality of IP/MPLS intra-connect routers 215 in parallel to the network planes. For example, the management system 325 is configured to determine that another network plane 205 is needed between two IP/MPLS intra-connect routers 325a and 325b and to determine the specific service(s) needed for this additional network plane 205.

When a total optical load capacity of the core network 200 for the service provider exceeds an amount that is capable of being supported by the network planes 205 currently existing, another network plane 205 is coupled/added to the plurality of IP/MPLS intra-connect routers 215 in parallel to the network planes 205 currently existing. In order to support/anticipate the total optical load capacity of the core network 200, the management system 325 is configured to make this determination and assign the appropriate additional network plane(s) 205 with the needed service(s) such that optical bundling is not required in the additional or currently existing network planes 205.

When the network planes 205 transport a total optical load between the first geographical location and the second geographical location in which the total optical load exceeds the maximum optical load capacity of the optical switch for the network planes, the total optical load is divided among the network planes coupled to the first IP/MPLS intra-connect router 215 at the first end and the second IP/MPLS intra-connect router 215 at the second end in order that none of the network planes 205 exceeds the maximum optical load capacity of its respective optical switch 310. The network planes 205 are configured to comprise a single service between the first IP/MPLS intra-connect router 215 at the first end and the second IP/MPLS intra-connect router 215 at the second end. The network planes 205 are configured to comprise multiple services between the first IP/MPLS intra-connect router 215 at the first end and the second IP/MPLS intra-connect router 215 at the second end.

Now referring to FIG. 5, FIG. 5 illustrates a flow chart 500 for management system 325 managing the IP/MPLS intra-connect routers 325 and the network planes 205 according to exemplary embodiments. The management system 325 includes memory for storing a program for managing the IP/MPLS intra-connect routers 215 and the network planes 205. Also, the management system 325 includes at least one processor functionally coupled to the memory and responsive to computer-executable instructions contained in the program.

The management system 325 is configured to manage a first IP/MPLS intra-connect router 215 operating multiprotocol label switching under Internet protocol for packets, where network planes 205 are coupled in parallel to the first IP/MPLS intra-connect router 215 and a second IP/MPLS intra-connect router 215 to form a core network 200 for a service provider at block 505.

The management system 325 is configured to instruct the first IP/MPLS intra-connect router 215 to route optical traffic over the network planes 205 to the second IP/MPLS intra-connect router 215 as defined by a maximum optical load capacity of a respective optical switch 310 in each of the network planes 205 at block 510.

Figure 6:
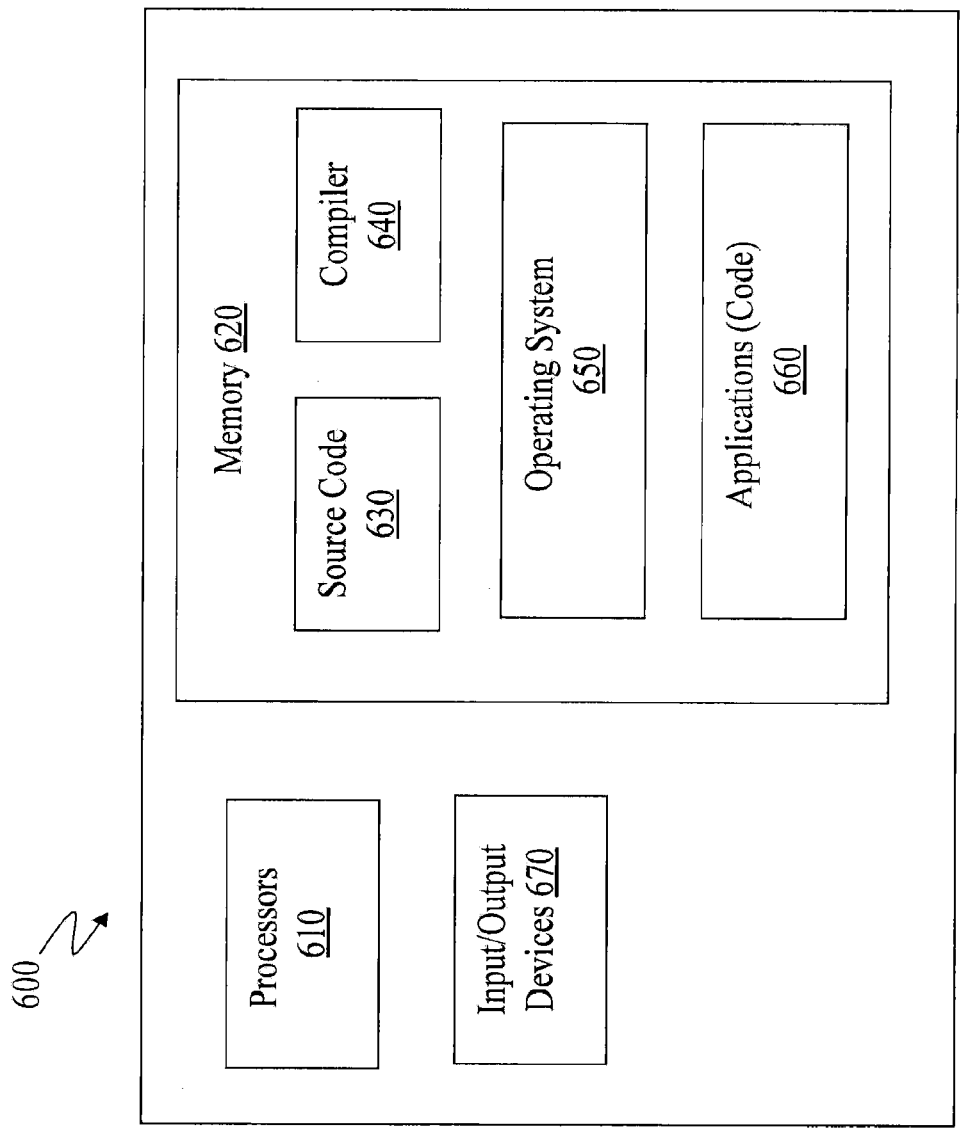
FIG. 6 illustrates an example of a computer having capabilities, which may be included in exemplary embodiments.

FIG. 6 illustrates an example of a computer 600 having capabilities, which may be included in exemplary embodiments. Various methods, procedures, modules, flow diagrams, tools, application, architectures, systems, views, and techniques discussed herein may also incorporate and/or utilize the capabilities of the computer 600. Moreover, capabilities of the computer 600 may be utilized to implement features of exemplary embodiments discussed herein. One or more of the capabilities of the computer 600 may implement any element discussed herein such as in above FIGS. 1-5.

Generally, in terms of hardware architecture, the computer 600 may include one or more processors 610, computer readable storage memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, controllers, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable medium 620 for use by or in connection with an instruction execution system, apparatus, server, or device, such as a computer-based system, processor-containing system, or other system that can fetch the instructions from the instruction execution system, apparatus, or device and execute the instructions.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices, servers, routers, switches, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described herein with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. An architecture for a core network for a single service provider, comprising:
   a plurality of intra-connect routers operating multiprotocol label switching under internet protocol for packets; and
   network planes coupled in parallel to the plurality of intra-connect routers to form the core network for the single service provider, in which the network planes of the single service provider include a first network plane exclusively carrying internet traffic and a second network plane exclusively carrying business traffic;
   wherein each of the network planes is defined by a maximum optical load capacity of an optical switch;
   wherein the network planes are connected to a first intra-connect router at a first end and a second intra-connect router at a second end, such that devices in one network plane are not individually connected to other devices in another network plane except by connections to the first and second intra-connect routers.

2. The architecture of claim 1, wherein each of the network planes comprises the maximum optical load capacity for transporting optical loads on fiber optic cable without requiring optical bundling at the optical switch.

3. The architecture of claim 1, wherein when the maximum optical load capacity of the optical switch is exceeded in one of the network planes, another network plane is coupled to the plurality of intra-connect routers in parallel to the network planes.

4. The architecture of claim 1, wherein when a total optical load capacity of the core network for the single service provider exceeds an amount that is capable of being supported by the network planes currently existing without optical bundling, another network plane is coupled to the plurality of intra-connect routers in parallel to the network planes currently existing.

5. The architecture of claim 1, wherein the network planes coupled in parallel to the plurality of intra-connect routers to form the core network for the single service provider comprises:
the first intra-connect router at the first end being at a first geographical location; and
the second intra-connect router at the second end being at a second geographical location different from the first geographical location;
wherein the devices in the one network plane include optical switches and multiprotocol label switching routers within the core network of the single service provider;
wherein the other devices in the another network plane include other optical switches and other multiprotocol label switching routers within the core network of the single service provider.

6. The architecture of claim 5, wherein the network planes transport a total optical load between the first geographical location and the second geographical location in which the total optical load exceeds the maximum optical load capacity of the optical switch for the network planes; and
wherein the total optical load is divided among the network planes coupled to the first intra-connect router at the first end and the second intra-connect router at the second end in order that none of the network planes exceeds the maximum optical load capacity of the optical switch.

7. The architecture of claim 1, wherein the network planes are configured to comprise a single service between the first intra-connect router at the first end and the second intra-connect router at the second end; and
wherein the network planes include a third network plane exclusively carrying mobile phone traffic and a fourth network plane exclusively carrying television traffic.

8. The architecture of claim 1, wherein one of the network planes comprises multiple services between the first intra-connect router at the first end and the second intra-connect router at the second end.

9. A method for an architecture for a core network of a single service provider, comprising:
providing a plurality of intra-connect routers operating multiprotocol label switching under internet protocol for packets;
coupling network planes in parallel to the plurality of intra-connect routers to form the core network for the single service provider, in which the network planes of the single service provider include a first network plane exclusively carrying internet traffic and a second network plane exclusively carrying business traffic; and
defining each of the network planes by a maximum optical load capacity of an optical switch;
wherein the network planes are connected to a first intra-connect router at a first end and a second intra-connect router at a second end, such that devices in one network plane are not individually connected to other devices in another network plane except by connections to the first and second intra-connect routers.

10. The method of claim 9, wherein each of the network planes comprises the maximum optical load capacity for transporting optical loads on fiber optic cable without requiring optical bundling at the optical switch.

11. The method of claim 9, wherein when the maximum optical load capacity of the optical switch is exceeded in one of the network planes, another network plane is coupled to the plurality of intra-connect routers in parallel to the network planes.

12. The method claim 9, wherein when a total optical load capacity of the core network for the single service provider exceeds an amount that is capable of being supported by the network planes currently existing without optical bundling, another network plane is coupled to the plurality of intra-connect routers in parallel to the network planes currently existing.

13. The method of claim 9, wherein coupling network planes in parallel to the plurality of intra-connect routers to form the core network for the single service provider comprises:
the first intra-connect router at the first end being at a first geographical location; and
the second intra-connect router at the second end being at a second geographical location different from the first geographical location.

14. The method of claim 13, wherein the network planes transport a total optical load between the first geographical location and the second geographical location in which the total optical load exceeds the maximum optical load capacity of the optical switch for the network planes; and
wherein the total optical load is divided among the network planes coupled to the first intra-connect router at the first end and the second intra-connect router at the second end in order that none of the network planes exceeds the maximum optical load capacity of the optical switch.

15. The method of claim 9, wherein the network planes are configured to comprise a single service between the first intra-connect router at the first end and the second intra-connect router at the second end.

16. The method of claim 9, wherein the network planes are configured to comprise multiple services between the first intra-connect router at the first end and the second intra-connect router at the second end.

17. A management system of a single service provider, comprising:
memory for storing a program; and
a processor, functionally coupled to the memory, the processor being responsive to computer-executable instructions contained in the program and operative to:
manage a first intra-connect router operating multiprotocol label switching under internet protocol for packets, wherein network planes are coupled in parallel to the first intra-connect router and a second intra-connect router to form a core network for the single service provider, in which the network planes of the single service provider include a first network plane exclusively carrying internet traffic and a second network plane exclusively carrying business traffic; and instruct the first intra-connect router to route optical traffic over the network planes to the second intra-connect router as defined by a maximum optical load capacity of a respective optical switch in each of the network planes;

wherein the network planes are connected to the first intra-connect router at a first end and the second intra-connect router at a second end, such that devices in one network plane are not individually connected to other devices in another network plane except by connections to the first and second intra-connect routers.

18. The management system of claim 17, wherein each of the network planes comprises the maximum optical load capacity for transporting optical loads on fiber optic cable without requiring optical bundling at the respective optical switch in each of the network planes; and wherein the respective optical switch in each of the network planes is a different optical switch residing in each of the network planes and having a corresponding maximum optical load capacity.

19. The management system of claim 17, wherein when the respective optical switch in each of the network planes has a different maximum optical load capacity, the processor is operative to assign an optical load to the network planes based on the different maximum optical load capacity for the respective optical switch in each of the network planes.

20. The management system of claim 17, wherein for the network planes coupled to the first intra-connect router, the processor is operative to store a type of service and the maximum optical load capacity for the respective optical switch.

* * * * *